United States Patent
Cherian et al.

(10) Patent No.: US 7,225,242 B2
(45) Date of Patent: May 29, 2007

(54) SYSTEM AND METHOD FOR MATCHING STORAGE DEVICE QUEUE DEPTH TO SERVER COMMAND QUEUE DEPTH

(75) Inventors: Jacob Cherian, Austin, TX (US); Thomas J. Kocis, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1077 days.

(21) Appl. No.: 09/770,907

(22) Filed: Jan. 26, 2001

(65) Prior Publication Data

US 2002/0103923 A1    Aug. 1, 2002

(51) Int. Cl.
*G06F 15/173*    (2006.01)
*G06F 15/16*    (2006.01)

(52) U.S. Cl. .................. 709/223; 709/208; 709/224

(58) Field of Classification Search ............. 709/203, 709/213, 219, 223, 226, 228, 232, 233, 208, 709/224

See application file for complete search history.

(56) References Cited

U.S. PATENT DOCUMENTS

| | | | |
|---|---|---|---|
| 5,140,683 A | 8/1992 | Gallo | |
| 5,313,585 A | 5/1994 | Jeffries et al. | 395/275 |
| 5,313,626 A | 5/1994 | Jones et al. | 395/575 |
| 5,359,611 A | 10/1994 | Parks et al. | 370/404 |

(Continued)

FOREIGN PATENT DOCUMENTS

| JP | 8171526 | 7/1996 |
|---|---|---|
| JP | 9198264 | 7/1997 |

OTHER PUBLICATIONS

Pending U.S. Appl. No. 09/330,725 entitled "Method and System for Establishing A Storage Area Network Configuration" filed by Ahmad Tawil, Assignee-Dell USA L.P., filed Jan. 11, 1999.
Pending U.S. Appl. No. 09/330,302 entitled "Policy Based Storage Configuration" filed by Narayan Devireddy et al., Assignee-Dell USA L.P., filed Jun. 11, 1999.

(Continued)

*Primary Examiner*—Ario Etienne
*Assistant Examiner*—Hussein El-chanti
(74) *Attorney, Agent, or Firm*—Baker Botts L.L.P.

(57) ABSTRACT

A system and method for correlating the command queue depth of the servers of a storage area network to the command queue depth of the storage controllers of the computer network are provided. For each storage controller, the servers are identified that have logical ownership of the logical storage units managed by each respective storage controller. For each storage controller, the execution throttle levels for those servers that have logical ownership over logical storage units of the storage controller are verified according to rules governing the command throughput of the servers and the storage controllers. If, for any of the storage controllers of the network, the summed execution throttle level exceeds the command queue depth of the storage controller, the execution throttle level of one or more of the servers of the network is adjusted to insure that the potential command throughput of the servers of the network conforms to the standards established for governing the relation of command throughput between servers and storage controllers.

27 Claims, 5 Drawing Sheets

U.S. PATENT DOCUMENTS

| | | | |
|---|---|---|---|
| 5,404,454 A | 4/1995 | Parks | 395/275 |
| 5,426,736 A | 6/1995 | Guineau | |
| 5,473,761 A | 12/1995 | Parks et al. | 395/404 |
| 5,530,960 A | 6/1996 | Parks et al. | 395/825 |
| 5,598,577 A | 1/1997 | Overfield | 395/830 |
| 5,623,672 A * | 4/1997 | Popat | 710/240 |
| 5,649,092 A | 7/1997 | Price et al. | |
| 5,680,539 A | 10/1997 | Jones | |
| 5,940,612 A | 8/1999 | Brady et al. | |
| 5,991,812 A | 11/1999 | Srinivasan | |
| 6,029,237 A | 2/2000 | Beelitz | 711/173 |
| 6,141,707 A | 10/2000 | Halligan | |
| 6,157,962 A | 12/2000 | Hodges et al. | |
| 6,157,963 A | 12/2000 | Courtright et al. | |
| 6,170,042 B1 | 1/2001 | Gaertner et al. | |
| 6,341,309 B1 * | 1/2002 | Vaid et al. | 709/223 |
| 6,389,432 B1 * | 5/2002 | Pothapragada et al. | 707/205 |
| 6,526,478 B1 * | 2/2003 | Kirby | 711/114 |
| 6,535,518 B1 * | 3/2003 | Hu et al. | 370/401 |
| 6,542,964 B1 * | 4/2003 | Scharber | 711/122 |
| 6,581,104 B1 * | 6/2003 | Bereiter | 709/232 |
| 6,618,818 B1 * | 9/2003 | Wahl et al. | 714/6 |
| 6,629,213 B1 * | 9/2003 | Sharma | 711/144 |
| 6,735,631 B1 * | 5/2004 | Oehrke et al. | 709/226 |
| 6,836,785 B1 * | 12/2004 | Bakshi et al. | 709/203 |
| 6,857,025 B1 * | 2/2005 | Maruyama et al. | 709/235 |

OTHER PUBLICATIONS

Pending U.S. Appl. No. 09/464,843 entitled "Method and Storage Device Masking in a Storage Area Network and Storage Controller and Storage Subsystem for Using Such a Method" filed by Stephen G. Luning, et al., Assignee-Dell USA L.P., filed Dec. 16, 1999.

Pending U.S. Appl. No. 09/482,231 entitled "Method and System for Connecting Dual Storage Interfaces" filed by Stuart William Hayes, Assignee-Dell USA L.P., filed Jan. 13, 2000.

Pending U.S. Appl. No. 09/488,326 entitled "A Method for Preparing Computer Hard Disks During Installation of a Network Operating System" filed by Alan E. Beelitz et al., Assignee-Dell USA L.P., filed Jan. 20, 2000.

Pending U.S. Appl. No. 09/491,578 entitled "System and Method for Disk and Tape Sharing in a Multi-Computer Environment" filed by Karl D. Schubert et al., Assignee-Dell USA L.P., filed Jan. 25, 2000.

Pending U.S. Appl. No. 09/524,401 entitled "System and Method for Managing Storage Resources in a Clustered Computing Environment" filed by Ahmad H. Tawil et al., Assignee-Dell Products L.P., filed Mar. 9, 2000.

Pending U.S. Appl. No. 09/565,020 entitled "System and Method for Reliably Assigning and Protecting Data in a Centralized Storage System" filed by Nam Nguyen et al., Assignee-Dell Products L.P., filed May 4, 2000.

Pending U.S. Appl. No. 09/609,085 entitled "A Computer Storage System and Failover Method" filed by Ahmad Tawil et al., Assignee-Dell Products L.P., Jun. 30, 2000.

Pending U.S. Appl. No. 09/636,347 entitled "System and Method for the Prevention of Corruption of Networked Storage Devices During Backup Data Recovery" filed by David S. Kelman, Assignee-Dell Products L.P., Aug. 10, 2000.

Pending U.S. Appl. No. 09/637,093 entitled "A Cluster-Based System and Method of Recovery From Server Failures" filed by Nam Nguyen et al., Assignee-Dell Products L.P., filed Aug. 10, 2000.

IBM Technical Disclosure Bulletin, pp. 3492-3493, Jan. 1986.

* cited by examiner

SYSTEM AND METHOD FOR MATCHING STORAGE DEVICE QUEUE DEPTH TO SERVER COMMAND QUEUE DEPTH

TECHNICAL FIELD

The present disclosure relates generally to the field of storage area networks and, more particularly, to a system and method for matching in a storage area network the queue depth of the various storage devices to the execution throttle of the servers of the storage area network.

BACKGROUND

A storage area network (SAN) may be used to provide centralized data sharing, data backup, and storage management. A storage area network is a high-speed network of shared storage devices. Elements of a SAN include servers, switches, storage controllers, and storage devices. A storage device is any device that principally contains a single disk or multiple disks for storing data for a computer system or computer network. Each server is usually connected to the network by a host bus adapter (HBA) and will include an HBA device driver, which is the software driver for the HBA. The collection of storage devices is sometimes referred to as a storage pool. The storage devices in a SAN can be collocated, which allows for easier maintenance and easier expandability of the storage pool. The network architecture of most SANs is such that all of the storage devices in the storage pool are potentially available to all the servers that are coupled to the SAN. Additional storage devices can be easily added to the storage pool, and these new storage devices will also be accessible from any server on the SAN.

In a computer network that includes a SAN, the server can act as a pathway or transfer agent between the end user and the stored data. Network servers can access a SAN using the Fiber Channel protocol, taking advantage of the ability of a Fibre Channel fabric to serve as a common physical layer for the transport of multiple upper-layer protocols, such as SCSI, IP, and HIPPI, among other examples. With respect to storage, any element of storage on a SAN may be assigned its own SCSI logical unit number (LUN). The LUN address of each storage element is used to identify the storage element within the SAN. Each storage element and its associated LUN are assigned to one or more of the servers of the SAN. Following this assignment, each server will have logical ownership of one or more LUNs, allowing data generated by the server to be stored in the storage devices corresponding to the LUNs owned by the server.

Along with its advantages, the SAN environment also has additional complexities. One of the complexities relates to the relationship between the execution throttle levels of servers and command queue depth settings of storage controllers in a SAN. As noted above, a SAN may be used to provide access to multiple storage devices from multiple host servers. In a SAN, the number of hosts that each storage controller can support is described as the fan out for the storage controller. The fan out value for a storage controller is the number of servers that can access its storage resources. The command queue depth of the storage controller is the maximum number of input/output (I/O) commands that the device can queue up for processing, past which the commands are either dropped or returned with a busy status. Dropping commands or returning a busy status results in a degradation of the performance of the overall system. The maximum number of I/O commands that a server can have outstanding is generally referred to as the server's execution throttle. The execution throttle is typically controlled by configuration settings in the HBA device driver. A SAN will generally operate most efficiently when the command queue of each storage controller of the network is at or near capacity without ever having exceeded capacity.

A difficulty with the selection of execution throttles for the servers of the SAN concerns the possibility that the execution throttle of a server will be set too high or too low. When an execution throttle value is set too high, that is, when the sum of execution throttles on host servers that own LUNs on a particular storage device exceeds the command queue depth for that storage device, the total I/O demand from the servers is too high as compared to the command capacity, as measured by the command queue depth, of the storage controllers of the SAN, resulting in dropped commands or busy signals returned by the storage controllers. In addition, when an execution throttle value is set too low on a particular server, such as when a low setting is desired in order to insure that the I/O demand from the servers does not exceed the command capacity of the coupled storage controllers, the performance of the server may be severely affected by the inability to process commands fast enough to satisfy the demands of the operating system and application programs that generate the commands.

For many SANs and SAN administrators, a common method for selecting the execution throttle levels of the servers of the SAN is to set the execution throttle for each host to a value that is determined at setup by dividing the smallest command queue depth value of all of the storage controllers on the SAN by the number of servers. This method, however, does not take into account the possibility of varying command queue depths among the several storage controllers on the SAN. As a result, all storage controllers, including those having the capacity for higher command queue depths, are treated as though they have the capacity of the storage controller with the smallest queue depth. Thus, one difficulty of setting a server execution throttle according to this technique is the likelihood that many storage controllers on the SAN will operate at less than their maximum capacity.

Another difficulty of establishing the server execution throttles of the servers of the SAN concerns the process of individually or manually adjusting the execution throttles of one or more of the servers on the SAN. This task is often logistically challenging, burdensome, and time-consuming. An administrator of the SAN must calculate a new value for the execution throttle and must manually reset the execution throttle of every server on the SAN. The problem of resetting server execution throttle is exacerbated when a SAN has multiple storage devices that have different queue depths. Therefore, a method is needed to calculate and reset the execution throttle of servers on the SAN in a manner that is less burdensome and time-consuming to the administrator of the SAN. Another issue with the current method of managing the execution throttle of the servers on the SAN relates to the manual process that the administrator must perform to calculate and set the execution throttle of all the servers on the SAN. Because the process is manual in nature, relying primarily on hand calculations and the manual setting of the execution throttle of each server on the SAN, the process is subject to errors that are potentially very difficult to troubleshoot.

SUMMARY

In accordance with the present disclosure, a method and system is provided for correlating the execution throttle levels of the servers of a storage area network to the command queue depth of the storage controllers of the storage area network. The method described in the present disclosure involves determining for each storage controller of the network the logical storage units that are managed by the storage controller. For each storage controller, the servers are identified that have logical ownership of the logical storage units managed by each respective storage controller. For each storage controller, the execution throttle levels for those servers having logical ownership over logical storage units of the storage controller are summed, and the result is compared to the command queue depth of the respective storage controller. If, for any of the storage controllers of the network, the summed execution throttle level exceeds the command queue depth, the execution throttle level of one or more of the servers of the network must be adjusted to insure that the potential command throughput of the servers of the network is not greater than the maximum command throughput of the storage controllers of the network.

The method and system disclosed herein are advantageous in that they allow for the automated verification and adjustment of the execution throttle levels of the servers of the network. Because the execution throttle levels may be adjusted by an automated technique, it can be determined through an automated technique whether the entire network complies with the rule correlating the command throughput of the servers and storage controllers of the network. Another advantage of the method and network disclosed herein is the ability to verify whether a change to the execution throttle level of one server in the network has a detrimental effect on any of the other servers in the network. The method of the present disclosure accommodates the manual adjustment of execution throttle levels, while providing an automated means for verifying the throughput correlation of the network and automatically adjusting the execution throttle levels of one or more servers, if necessary.

The method and system disclosed herein are also advantageous in that the determination of whether the throughput correlation of the network is satisfied is made by examining the command queue depth of each storage controller, rather than relying on the command queue depth of the storage controller having the shallowest command queue depth. In this manner, the execution throttle levels of the servers can be set so that the levels correspond more closely to the maximum throughput levels of the servers. In addition, a server can maintain a separate execution throttle for each storage device that the server accesses, which allows an execution throttle level to be made specific and managed independently for each storage controller, resulting in increased server performance.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The present disclosure concerns a method and system for matching or correlating in a SAN the execution throttle of the servers of the network to the queue depth of the storage controllers of the network. The method described herein involves adjusting the execution throttle of the servers of the network as part of the determination of a suitable execution throttle level for each server of the network. A suitable execution throttle level is determined following an evaluation at each storage controller of the command queue depth of the storage controller and the logical ownership of the LUNs of the storage device by the servers of the network. The sum of the execution throttle or command throughput of those servers having logical ownership over a LUN managed by a single storage controller must not exceed the command queue depth or command throughput of that storage controller. By applying this rule to each of the storage controllers of the network, the execution throttle of each network server can be set so that no storage controller in the network will suffer from dropped commands or busy signals. In addition to the verification and adjustment algorithms outlined in the description herein, other automated verification and adjustment schemes can be employed to insure that potential command throughputs of the servers of the SAN and the maximum command throughputs of the storage controllers of the SAN are correlated on the basis of LUN ownership by servers of the SAN.

Figure 1:
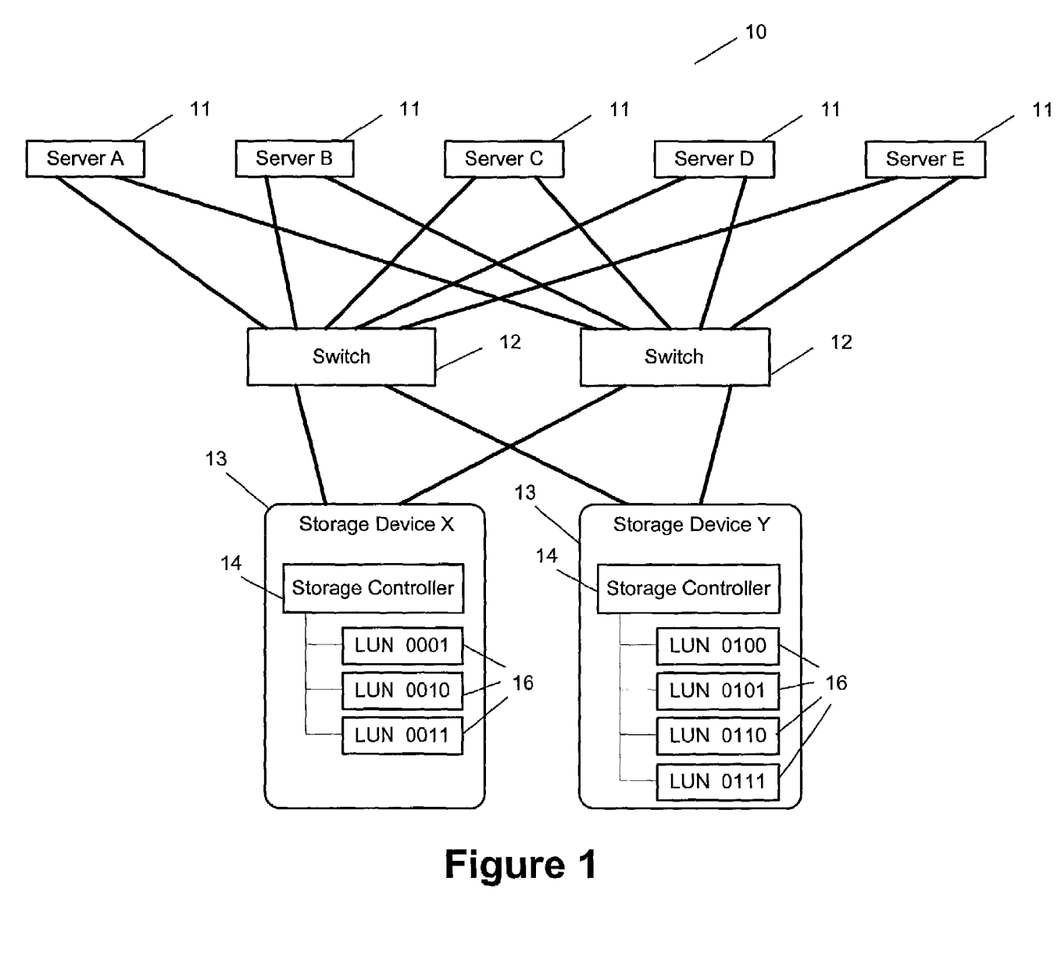
FIG. 1 is a block diagram of an embodiment of a storage area network.

Shown in FIG. 1 is a diagram of the architecture of a storage area network, which is indicated generally at 10. SAN 10 includes a number of servers 11, network switches 12, and storage devices 13. The physical storage within any storage device may be logically subdivided into one or more logical storage units. Each of these logical representations of physical storage is assigned a LUN. The term LUN is often used to refer both to the unique number that is assigned by the SAN to the logical storage unit and to the logical storage unit itself. In the network architecture of FIG. 1, Storage Device X of FIG. 1 includes a storage controller 14 and multiple logical storage units or LUNs 16. Each logical storage unit 16 is assigned a unique numeric identifier or LUN. For the sake of example, the LUNs of FIG. 1 are shown as four digit binary numbers. Like Storage Device X, Storage Device Y includes a storage controller 14 and a number of logical storage units or LUNs 16, each having a unique logical identifier.

Each LUN 16 is logically normally owned by a single host server 11, although a LUN may be owned by multiple servers 11, as in the case of clustered servers. A single host server, however, may have logical ownership over multiple LUNs. As an example, Server A may have logical ownership over LUN 0001 in Storage Device X. Server B may have logical ownership over LUN 0010 in Server X and LUN 0100 in Storage Device Y. Server C may have logical ownership over LUN 0011 in Storage Device X and LUN 0101 in Storage Device Y. Server D may have logical ownership over LUN 0110 in Storage Device Y, and Server E may have logical ownership over LUN 0111 in Storage Device Y. As described, each LUN is assigned to just one network server, although a network server, such as Servers B and C in this example, may have logical ownership over multiple LUNs.

Figure 2:
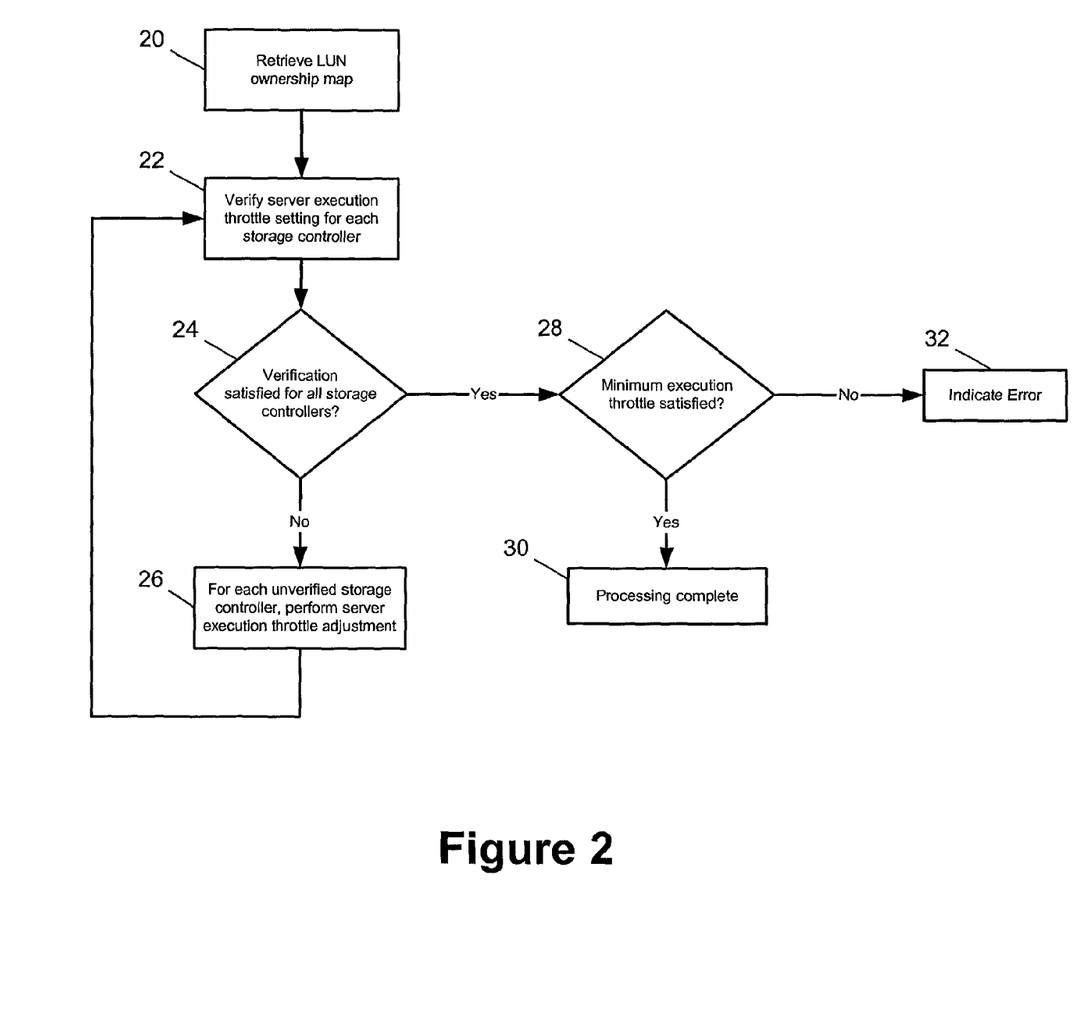
FIG. 2 is a flow chart of a method for verifying and matching storage device queue depth to server execution throttle.

A flow diagram of the steps of setting the execution throttle of the host servers of the SAN is shown in FIG. 2. At step 20, a LUN ownership map is retrieved. The LUN ownership map of the SAN identifies, for each LUN, the server or servers that have logical ownership over the LUN. In the example of FIG. 1, each of servers A, B, and C has logical ownership over one of the LUNs in Storage Device X, and each of Servers B, C, D, and E has logical ownership over one of the LUNs in Storage Device Y. At step 22, the execution throttle levels or command throughput of each network server that has logical ownership over a LUN of the respective storage controller are summed. As part of step 22, a verification test is performed to determine whether the summed execution throttle value exceeds the command queue depth or command throughput of the associated storage controller. The rule of step 22 for this example is set out below in Equations 1 and 2:

$$\text{Execution Throttle on Servers } (A+B+C) < \text{Command Queue Depth of Storage Device X} \quad \text{Equation 1}$$

$$\text{Execution Throttle on Servers } (B+C+D+E) < \text{Command Queue Depth of Storage Device Y} \quad \text{Equation 2}$$

As to Equation 1, because each of Servers A, B, and C has logical ownership of a LUN on Storage Device X, the execution throttle of each of Servers A, B, and C is summed and compared to the command queue depth of Storage Device X. As to Equation 2, because each of Servers B, C, D, and E has logical ownership of a LUN on Storage Device Y, the execution throttle levels of each of Servers B, C, D, and E are summed and compared to the command queue depth of Storage Device Y.

The verification step of step 22 is performed for each storage controller of the SAN. If the verification step is not satisfied for any storage controller, processing continues at step 26, where the execution throttle is incremented or decremented by at least one increment on at least one of the servers associated with the storage controller associated with the unsatisfied verification step. At step 26, any number of algorithms may be applied to determine which of several potential servers should be adjusted and the amount by which the execution throttle of any server should be adjusted. As one example, the server associated with the unverified storage controller that has the highest execution throttle or throughput rate may be decremented by a set increment. As another example, a server whose execution throttle is adjusted is selected from the servers associated with the unverified storage controller in round robin fashion. The execution throttle adjustment step of step 26 is applied to the network with respect to each storage controller that did not pass the verification test of step 22. Once the adjustment step is complete, processing continues with the verification step of step 24. Step 22 (test), step 24 (verification), and step 26 (adjustment) iterate until the verification step is satisfied for each storage controller, i.e., the sum of the execution throttle levels of the servers having logical ownership over a LUN in a storage controller are not greater than the command queue depth of the storage controller, insuring that the commands sent from the servers to the storage controllers of the network will be handled by the storage controllers and will not encounter a busy signal or be dropped.

If the verification step of step 24 is satisfied for each storage controller, the execution throttle level of each server in the SAN is at an acceptable level, and the iterative adjustment and verification steps are complete. It is next determined at step 28 whether the execution throttle of each server exceeds a minimum execution throttle setting. The logical rule of step 28 is set out in Equation 3:

$$\text{Execution Throttle of Server A} > \text{Minimum Throttle Level} \quad \text{Equation 3}$$

It is possible to satisfy Equations 1 and 2 by intentionally setting the throttle levels of each of the servers to a low level, thereby insuring that instructions sent by the servers to the storage controllers do not overburden the command queues of the storage controllers. Doing so, however, would severely degrade the performance of the servers. Performing the minimum throttle level verification of step 28 insures that the servers will continue to be functional at the set throttle level. Enforcing a minimum execution throttle level also limits the number of unique servers that may have logical ownership over the LUNs managed by a storage controller. If the minimum throttle level verification of step 28 is satisfied, processing is complete. If the minimum throttle level verification of step 28 is not satisfied, an error message is provided to the network administrator that the automated throttle execution level process has failed. The steps in the flow diagram of FIG. 2 are just one example of the steps or algorithm that can be performed to automate the process of adjusting the execution throttles of the servers of the SAN to insure that potential command queue depths of the storage controllers of the SAN are greater than or equal to the maximum potential command throughput of the servers of the SAN.

Figure 3:
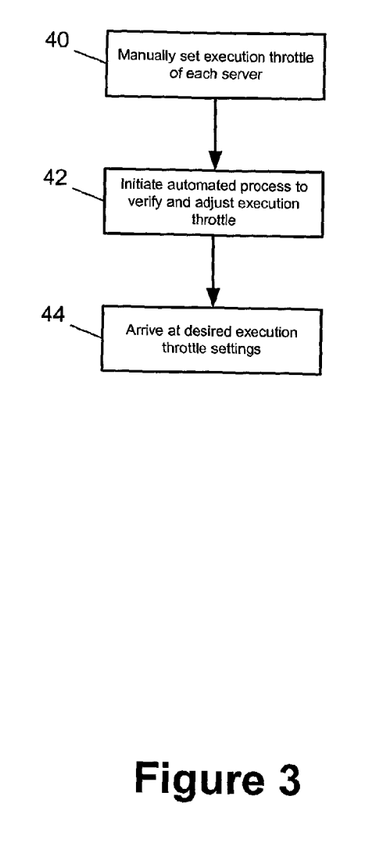
FIG. 3 is a flow chart of a method for adjusting execution throttle.
Figure 5:
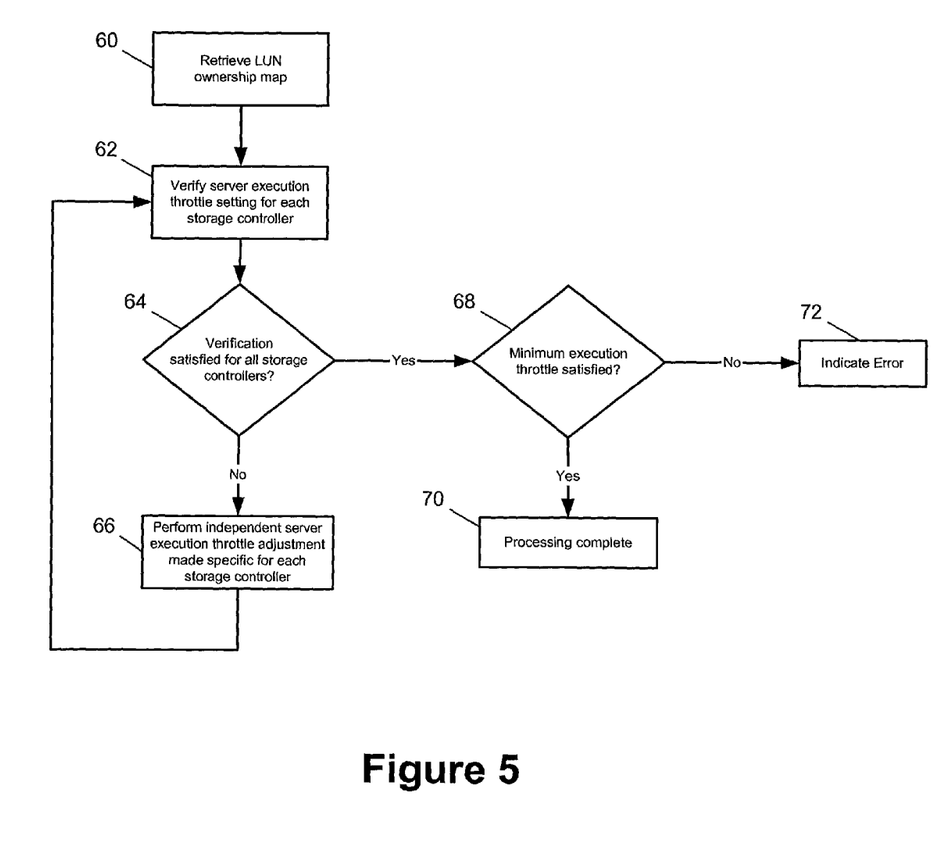
FIG. 5 is a flow chart of a method for verifying and matching storage device queue depth to independent server execution throttle made specific to each storage controller.

Aside from the automated process of setting the execution throttles of the servers of a SAN of FIG. 2, a network administrator may manually set the execution throttles of the servers of the SAN. This manual setting of execution throttles may occur, for example, after the conclusion of or in conjunction with the automated assignment of execution throttles. As an example, and as shown in FIG. 3, the administrator may at step 40 manually set the execution throttle of each server to its maximum value. At step 42, the automated process of adjusting the execution throttle levels of the servers of the SAN, such as the process described with respect to FIG. 2 or 5, is initiated. The process of step 42 results in the automated incrementing or decrementing of the execution throttles of the servers of the network until it is verified that the command throughput of each server of the SAN is set such that it is not possible for the command throughput of a server or the combined command throughput of a set of servers to exceed the command throughput of an associated storage controller of the network. At step 44, the result of the automated process of setting execution throttles for the servers of the SAN is a set of execution throttle settings that are correlated to the maximum command throughput of the associated storage controllers of the network. Thus, even though the administrator can manually set the execution throttle of one or more of the servers of the network, the automated throttle-setting process of the present disclosure, including the process steps described with respect to FIGS. 2 and 5, could be run to insure that the reset execution throttle levels of the affected servers are not set to levels that raise the possibility of dropped commands caused by an insufficient command queue depth on one or more of the storage controllers of the network.

A server can maintain a separate execution throttle for each storage device that is accessible by the server. As an example, a server may have access to LUNs that are managed by more than one storage controller. In this environment, the server may have a separate execution throttle level for each storage controller. This feature is useful in that it allows the network to more finely tune the execution throttle levels of the servers on a storage controller-specific basis in response to actual throughput of the server directed to individual storage controllers allowing for higher performance. For example, when the execution throttle of a server in relation to a particular storage controller is adjusted in order to optimize the throughput of the server in relation to the storage controller, it is not necessary to change the execution throttle of the server for all other storage controllers to which the server has access. FIG. 5 shows a process for adjusting execution throttle that is similar to the process described with respect to FIG. 2. The adjustment process of FIG. 5 differs from that of FIG. 2 in that at step 66 the server execution throttle is adjusted and managed independently for each storage controller. Thus, for each storage controller, the execution throttle levels of the servers having logical ownership of LUNs managed by the storage controller are set only with respect to the command throughput of each respective storage controller. The adjustment at step 66 allows a server to maintain a separate execution throttle for each storage device that the server accesses and allows the execution throttle level to be made specific and managed independently for each storage controller.

Figure 4:
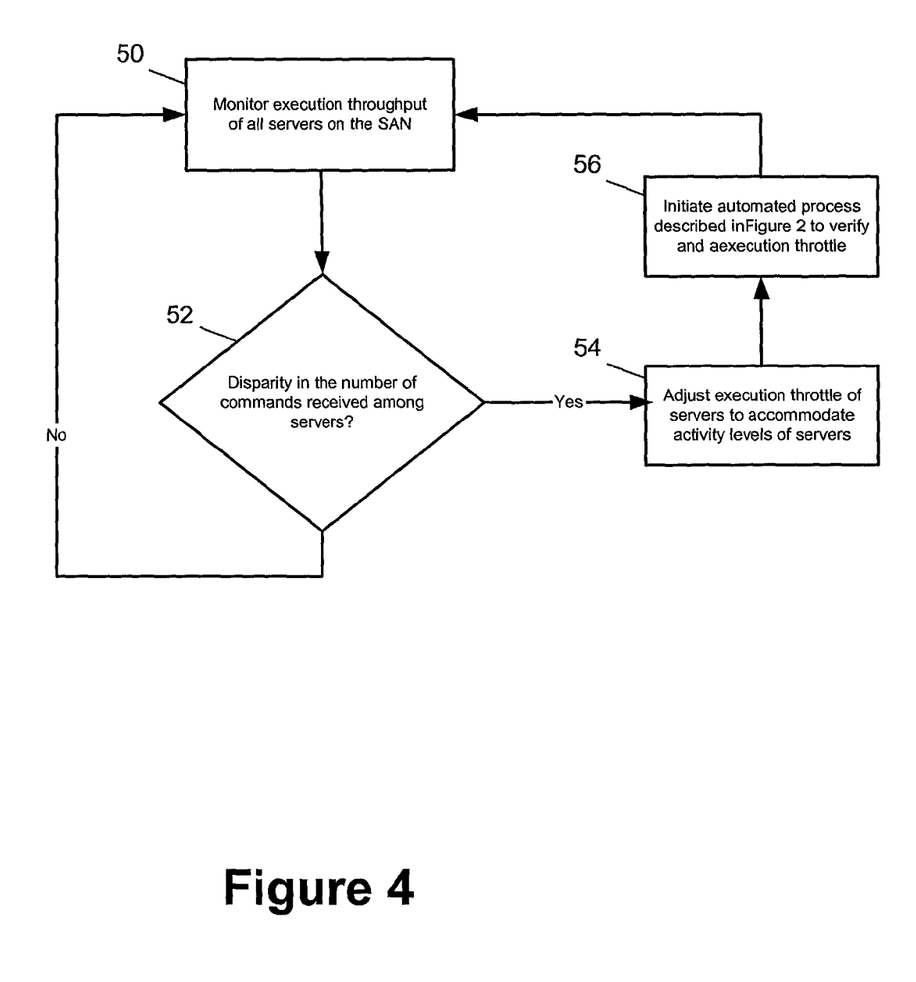
FIG. 4 is a flow chart of a method for monitoring command throughput of servers and adjusting execution throttle to accommodate server throughput levels.

The execution throttle levels of the servers of the network may also be adjusted in response to the operating characteristics of the network. An automated process may monitor the actual I/O demand of each server to identify those servers having higher command requests. This process may also monitor the input/output profile of each storage controller in the network to identify the most active servers of the group of servers that have logical ownership of the LUNs of each storage controller. As shown in FIG. 4, the actual execution throughput of each server is monitored at step 50. At step 50, the input/output profile of each server is monitored in an attempt to detect an opportunity to adjust the execution throttle levels of the servers to account for I/O demand differences among the set of servers associated with a single storage controller. If it is determined at step 52 that there is a significant difference in the input/output profile among one or more of the set of servers associated with a single storage controller, processing continues at step 54, where the execution throttle of the more active server or servers of the set is incremented and the execution throttle of the less active server or servers of the set is decremented. The combination of steps 52 and 54 permits the network to identify when there is an opportunity to tune the performance of the servers in response to the actual throughput of the servers and to adjust the execution throttle of those servers in response to the actual throughput. Following this adjustment, the automated throttle adjustment process, such as the one described with respect to FIG. 2 or 5, is initiated at step 56 to confirm that any adjustments made to the execution throttle levels of the servers of the network do not affect the operational integrity of the storage controllers of the network. At step 56, the execution throttle levels of the servers may be reset, if necessary, to correlate the command throughputs of the servers and storage controllers of the network. Following step 56, processing next continues at step 50. If it is determined at step 52 that there is not a significant disparity in the input/output profiles of the set of servers assigned to a certain storage controller, processing continues with the monitoring step of step 50 with the continued monitoring of the input/output profiles of the servers of the SAN.

The methodology disclosed herein for setting the execution throttles of the servers of a SAN is advantageous in that it takes into account the command queue depth of each storage controller when determining the setting of the execution throttle levels of the servers of the network. Rather than relying on the shallowest command queue depth as a guide or baseline for setting the execution throttle levels on the servers of the network, the technique disclosed herein sets the execution throttle levels of each server more precisely following an analysis of the potential throughput demands that could be placed on the storage controllers of the network that are associated with the respective servers of the network. Thus, rather than relying on a process for setting execution throttle levels that relies only on the storage controller having the shallowest command queue depth, the technique disclosed herein takes into account the networked or logical relationship between the servers, storage controllers, and logically owned storage units of the network.

The method and system disclosed herein also provide the opportunity to dynamically tune the throttle levels of the servers in response to the actual throughput characteristics of the network. The technique disclosed herein is also advantageous in that it can be automated and can be used to both accommodate and verify the manual adjustment of the execution throttle levels of the servers of the network. Further, the technique disclosed herein may be used to correlate the throughput of any related devices of a network and should not be limited in its application to a networked relationship of servers and storage controllers in a SAN. Rather, the methods of the present disclosure may be applied in any network relationship or configuration in which throughput limitations exist on related elements of the network.

Although the present disclosure has been described in detail, it should be understood that various changes, substitutions, and alterations can be made hereto without departing from the spirit and the scope of the invention as defined by the appended claims.

What is claimed is:

1. A method for correlating the execution throttle levels of the servers of a network to the command queue depth of the storage controllers in the network, each of the storage controllers managing one or more logical storage units, comprising the steps of:

identifying the servers of the network;

identifying the logical ownership of each logical storage unit on the network;

verifying that a rule governing the command throughput of the servers and storage controllers of the network is satisfied, the rule defining a relation between the execution throttle levels of the servers of the network and command queue depth of the storage controllers of the network;

wherein verifying said rule comprises:

summing, for each storage controller, the execution throttle levels of the servers that are identified as owning the logical storage units managed by the storage controller;

determining, for each storage controller, whether the summed execution throttle level exceeds the command gueue death of the storage controller; and if the summed execution throttle level exceeds the command gueue death then incrementing or decrementing the execution throttle level of at least one server of the network in response to a determination that the rule was not satisfied.

2. The method of claim 1, wherein the rule provides that, for each storage controller of the network, the sum of the execution throttle levels of the servers having logical ownership over a LUN of the storage controller does not exceed the command queue depth of the storage controller.

3. The method of claim 2, wherein the step of adjusting the execution throttle level of at least one server comprises the step of decrementing the execution throttle level for a selected server that is associated with a storage controller for which the rule was not satisfied.

4. The method of claim 3, wherein the selected server is the server that has the highest execution throttle among the set of servers associated with the storage controller for which the rule was not satisfied.

5. The method of claim 3, wherein the selected server is the server that has the highest input/output demand among the set of servers associated with the storage controller for which the rule was not satisfied.

6. The method of claim 3, wherein the selected server is selected according to a round robin format.

7. The method of claim 4, further comprising the step of repeating the verifying and adjusting steps until the sum of the execution throttle levels for the servers associated with a storage controller for which the rule was not satisfied does not exceed the command queue depth of the storage controller.

8. The method of claim 7, further comprising the step of determining whether the execution throttle of each server exceeds a minimum execution throttle setting.

9. The method of claim 8, wherein the verifying and adjusting steps are automated.

10. The method of claim 9, further comprising the step of setting each server such that each server is operating at its respective maximum execution throttle level prior to performing the first of the verifying and adjusting steps.

11. A storage area network, comprising:
a plurality of servers within the network, each server having an execution throttle;
a plurality of storage controllers coupled to the network, each storage controller having a command queue depth, and
each storage controller managing one or more logical storage units; wherein the execution throttle level of each server is set such that the execution throttle of each server is correlated to the command queue depth of each storage controller wherein the correlation of the execution throttle levels of each server to the command queue death of each storage controller is governed by a rule that, for each storage controller if the network, the sum of the execution throttle levels of the servers having logical ownership over a LUN of the storage controller does not exceed the command queue depth of the storage controller;
wherein the execution throttle level of the servers is increased or decreased such that the sum of the execution throttle levels of the servers associated with a storage controller for which the rule was not satisfied does not exceed the command queue depth of the storage controller.

12. The storage area network of claim 11, wherein the execution throttle level of the servers of the storage area network may be adjusted and verified repeatedly until the sum of the execution throttle level of the servers associated with a storage controller for which the rule was not satisfied does not exceed the command queue depth of the storage controller 13. The storage area network of claim 12, wherein the execution throttle level of each server further exceeds a minimum execution throttle level.

14. The storage area network of claim 13, wherein the adjustment and verification of execution throttle level is automated.

15. The storage area network of claim 14, wherein the execution throttle level of each server is set to a respective maximum level prior to adjusting or verifying the execution throttle levels of any of the servers of the storage area network.

16. A method for setting the execution throttle levels of a plurality of servers in a storage area network, the storage area network including a plurality of storage controllers, each of the storage controllers having associated therewith one or more logical storage units, comprising the steps of;
identifying for each storage controller the servers that logically own each of the logical storage units managed by the storage controller;
summing, for each storage controller, the execution throttle levels of the servers that are identified as owning the logical storage units managed by the storage controller;
determining, for each storage controller, whether the summed execution throttle level exceeds the command queue depth of the storage controller; and
if the summed execution throttle level exceeds the command queue depth,
incrementing or decrementing the execution throttle level of one or more of the servers of the storage area network.

17. A method for correlating the execution throttle levels of the servers of a network to the command queue depth of the storage controllers in the network, each of the storage controllers managing one or more logical storage units, comprising the steps of:
identifying the servers of the network;
identifying the logical ownership of each logical storage unit of on the network;
providing independent server execution throttles for each storage controller that is accessed by the servers;
verifying that a rule governing the command throughput of the servers and storage controllers accessed by the servers is satisfied, the rule defining, for each storage controller, a relation between the independent execution throttle levels of the servers accessing the storage controllers associated with the storage controller and the command queue depth of the storage controller;
wherein verifying said rule comprises:
summing, for each storage controller, the execution throttle levels of the independent servers that are identified as owning the logical storage units managed by the storage controller;
determining, for each storage controller, whether the summed execution throttle level exceeds the command gueue depth of the storage controller: and if the summed execution throttle level exceeds the command gueue depth then incrementing or decrementing the independent execution throttle level of at least one server in response to a determination that the rule was not satisfied.

18. The method of claim 17, wherein the rule provides that the sum of the independent execution throttle levels of the servers associated with a storage controller does not exceed the command queue depth of the storage controller.

19. The method of claim 18, wherein the step of adjusting the independent execution throttle level of at least one server comprises the step of decrementing the independent execution throttle level for a selected server that is associated with the storage controller for which the rule was not satisfied.

20. The method of claim 18, wherein the step of adjusting the independent execution throttle level of at least one server comprises the step of incrementing the execution throttle level for a selected server that is associated with the storage controller for which the rule was not satisfied.

21. The method of claim 19, wherein the selected server is the server that has the highest independent execution throttle among the set of servers associated with the storage controller for which the rule was not satisfied.

22. The method of claim 20, wherein the selected server is the server that has the highest command throughput among the set of servers associated with the storage controller for which the rule was not satisfied.

23. The method of claim 19, wherein the selected server is selected according to a round robin format.

24. The method of claim 21, further comprising the step of repeating the verifying and adjusting steps until the sum of the independent execution throttle levels for the servers associated with a storage controller for which the rule was not satisfied does not exceed the command queue depth of the storage controller.

25. The method of claim 24, further comprising the step of determining whether the independent execution throttle of each server exceeds a minimum execution throttle setting.

26. The method of claim 25, wherein the verifying and adjusting steps are automated.

27. The method of claim 26, further comprising the step of setting the independent execution throttle level of each server to a respective maximum level prior to performing the first of the verifying and adjusting steps.

* * * * *